(12) United States Patent
Matsuyama (10) Patent No.: US 9,074,687 B2
(45) Date of Patent: Jul. 7, 2015

(54) SEALING DEVICE FOR TURBOCHARGER

(75) Inventor: Yoshimitsu Matsuyama, Tokyo (JP)

(73) Assignee: IHI Corporation, Tokyo (JP)

( * ) Notice: Subject to any disclaimer, the term of this patent is extended or adjusted under 35 U.S.C. 154(b) by 579 days.

(21) Appl. No.: 13/517,487

(22) PCT Filed: Jan. 27, 2011

(86) PCT No.: PCT/JP2011/000429
§ 371 (c)(1),
(2), (4) Date: Jun. 20, 2012

(87) PCT Pub. No.: WO2011/093075
PCT Pub. Date: Aug. 4, 2011

(65) Prior Publication Data
US 2012/0263585 A1    Oct. 18, 2012

(30) Foreign Application Priority Data
Jan. 29, 2010  (JP) .................. 2010-018597

(51) Int. Cl.
*F04D 29/16* (2006.01)
*F16J 15/08* (2006.01)
*F02B 37/24* (2006.01)

(52) U.S. Cl.
CPC .............. *F16J 15/0887* (2013.01); *F02B 37/24* (2013.01)

(58) Field of Classification Search
CPC ..... F16J 15/0887; F02B 32/74; F01D 11/003; F01D 11/005
USPC ........ 415/206, 174.2, 212.1, 170.1, 204, 191, 415/178, 180; 277/300, 301, 304, 307, 409, 277/411, 387, 558, 927
See application file for complete search history.

(56) References Cited

U.S. PATENT DOCUMENTS

| | | | |
|---|---|---|---|
| 6,209,884 B1* | 4/2001 | Taudt | 277/607 |
| 2002/0074742 A1* | 6/2002 | Quoiani | 277/627 |
| 2006/0188368 A1 | 8/2006 | Jinnai et al. | |
| 2010/0247296 A1 | 9/2010 | Matsuyama | |
| 2010/0310365 A1 | 12/2010 | Matsuyama | |
| 2011/0182722 A1 | 7/2011 | Matsuyama | |

FOREIGN PATENT DOCUMENTS

| | | | |
|---|---|---|---|
| JP | 61-85503 A | 5/1986 | |
| JP | 63-57328 U | 4/1988 | |
| JP | 2006-125588 A | 5/2006 | |

(Continued)

OTHER PUBLICATIONS

International Search Report issued Mar. 29, 2011 in PCT/JP2011/000429.

*Primary Examiner* — Edward Look
*Assistant Examiner* — Aaron R Eastman
(74) *Attorney, Agent, or Firm* — Oblon, McClelland, Maier & Neustadt, L.L.P.

(57) ABSTRACT

A seal body 24 is formed annularly to have a fitted/fixed portion 25 airtightly fitted and fixed to a shoulder 22 in a turbine housing 1 formed facing a scroll passage 8 and have a clearance facing portion 27 facing an outer periphery of a turbine-housing-side exhaust introducing wall 9a with a clearance S, the clearance facing portion 27 being caused to be pressed against the exhaust introducing wall 9a due to a difference in fluid pressure between the clearance S and the scroll passage 8. Slipout preventive means 29 is formed on the fitted/fixed portion 25 of the seal body 24 for preventing the fitted/fixed portion 25 from slipping out of the shoulder 22.

4 Claims, 7 Drawing Sheets

(56) References Cited

FOREIGN PATENT DOCUMENTS

| JP | 2006-220053 A | 8/2006 |
| JP | 2007-309139 A | 11/2007 |
| WO | WO 2009/075058 A1 | 6/2009 |
| WO | WO 2009/104232 A1 | 8/2009 |

* cited by examiner

SEALING DEVICE FOR TURBOCHARGER

TECHNICAL FIELD

The present invention relates to a sealing device for a turbocharger.

BACKGROUND ART

Figure 1:
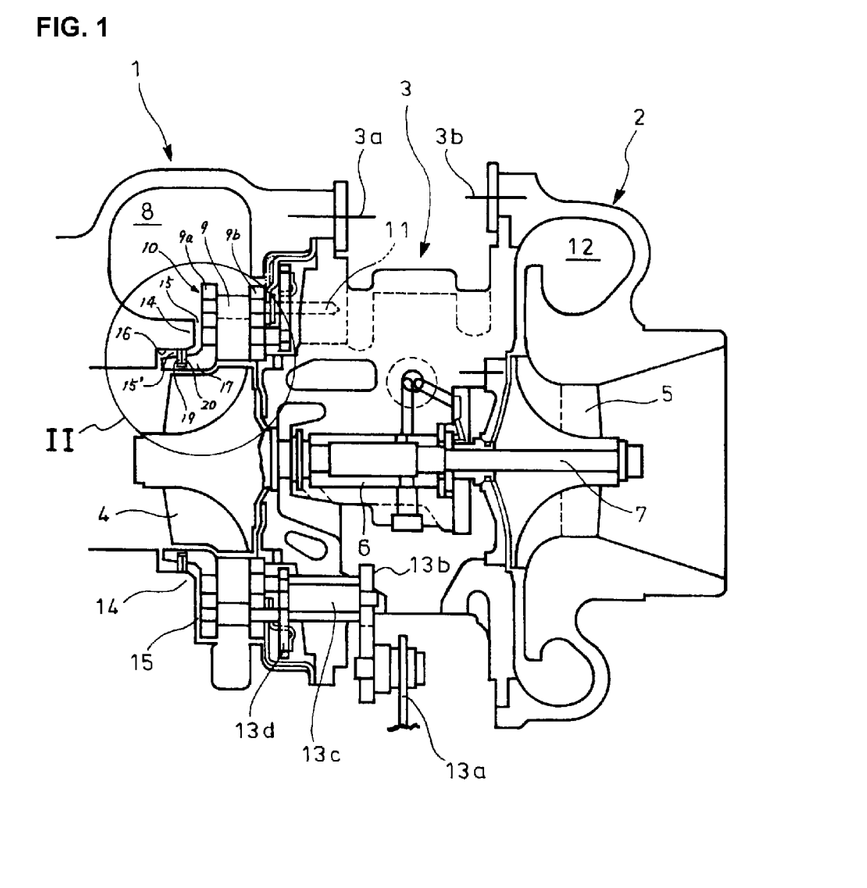
FIG. 1 is an sectional side elevation of a conventional sealing device for a turbocharger.

FIG. 1 shows a conventional sealing device for a variable geometry turbocharger. The turbocharger comprises turbine and compressor housings 1 and 2 integrally assembled via a bearing housing 3 with fastening bolts 3a and 3b, turbine and compressor impellers 4 and 5 in the housings 1 and 2 being coupled together with a turbine shaft 7 rotatably supported in the bearing housing 3 by a bearing 6.

Figure 2:
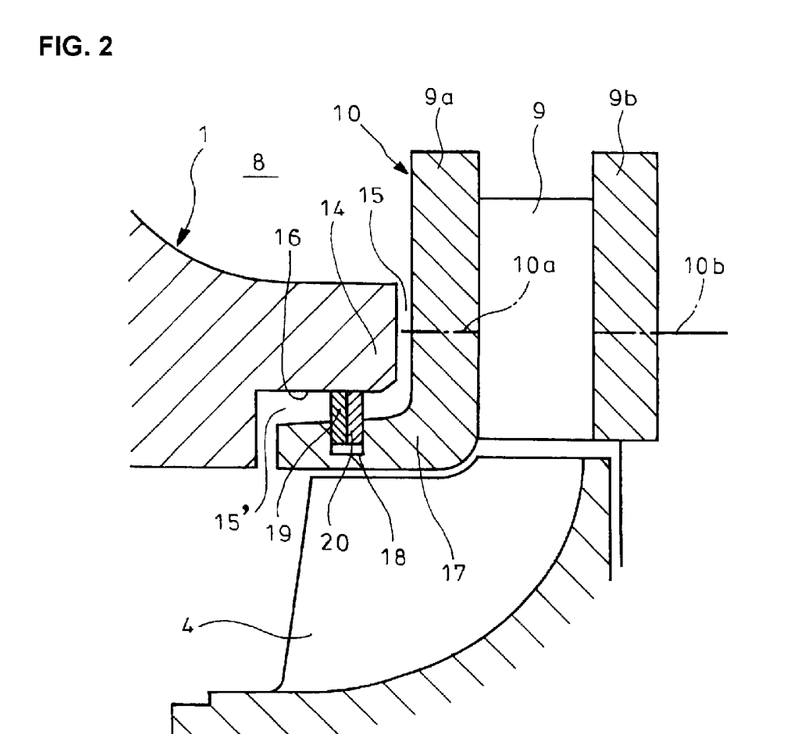
FIG. 2 is an enlarged view of a portion II in FIG. 1.

As shown in FIG. 2 which is an enlarged view of a portion II in FIG. 1, the bearing housing 3 has, on its side adjacent to the turbine housing 1, an exhaust nozzle 10 (shroud) with a plurality of radial vanes 9 arranged circumferentially equidistantly between turbine- and bearing-housing-side exhaust introducing walls 9a and 9b for guidance of fluid (exhaust gas) introduced in a scroll passage 8 of the housing 1 to the turbine impeller 4, the exhaust nozzle 10 being sandwiched by the turbine and bearing housings 1 and 3 and fixed with the fastening bolt 3a in FIG. 1.

In FIG. 2, reference numerals 10a and 10b denote vane shafts extending through the turbine- and bearing-housing-side exhaust introducing walls 9a and 9b of the exhaust nozzle 10 to rotatably support the vanes 9, the respective vanes 9 being supported on opposite sides thereof by the vane shafts 10a and 10b. Alternatively, the vanes 9 may be supported on the opposite sides thereof with the turbine-housing-side vane shafts 10a being short shafts not extending through the exhaust introducing walls 9a but embedded in bearing-housing-side surfaces of the walls 9a. Alternatively, without the turbine-housing-side vane shafts 10a, the vanes 9 may be supported in a cantilever manner only by the vane shafts 10b extending through the bearing-housing-side exhaust introducing wall 9b.

In FIG. 1, reference numeral 11 denotes a positioning pin used in assembling of the exhaust nozzle 10; 12, a scroll passage in the compressor housing 2; and 13a, 13b, 13c and 13d, a link mechanism for adjusting an opening degree of the vanes 9 via the vane shafts 10b.

The turbine housing 1 providing the scroll passage 8 is formed with a nozzle facing portion 14 which faces the turbine-housing-side exhaust introducing wall 9a of the exhaust nozzle 10, an annular gap 15 being formed between the nozzle 10 and the nozzle facing portion 14 to extend radially and open to the scroll passage 8. The exhaust introducing wall 9a constituting the exhaust nozzle 10 has an inner end extending as an extension 17 along the turbine impeller 4 toward a shoulder 16 formed on an inner periphery of the nozzle facing portion 14, which brings about a gap 15' between the extension 17 and the shoulder 16 opening to the inner periphery of the portion 14 and communicating with the gap 15.

The gaps 15 and 15' are inherently unnecessary, but are provided for countermeasure to, for example, any thermal deformation of the turbine housing 1 between hot and cold states and any dispersion in accuracy between parts to be assembled.

However, when the gaps 15 and 15' are present, the gas in the scroll passage 8 may disadvantageously leak through the gaps 15 and 15' from the higher to the lower pressure side, and the gas leakage substantially varies the performance of the turbocharger on a lower velocity side, leading to a problem such as unstable engine performance.

Thus, it has been conventionally proposed as shown in FIG. 2 that an annular groove 18 is formed on an outer periphery of the extension 17 of the exhaust nozzle 10, and sealing piston rings 19 and 20 generally used for a piston of an engine are fitted into the groove 18 to provide a sealing device, so that outer peripheries of the piston rings 19 and 20 are brought into close contact with an inner periphery of the shoulder 16 due to resilience of the rings 19 and 20. Thus, the gas leakage from the gaps 15 and 15' is prevented and any thermal deformation is absorbed.

General state-of-art relevant to the sealing device for the turbocharger shown in FIGS. 1 and 2 is disclosed, for example, in Patent Literature 1.

CITATION LIST

Patent Literature

[Patent Literature 1] JP2006-125588A

SUMMARY OF INVENTION

Technical Problems

Figure 3:
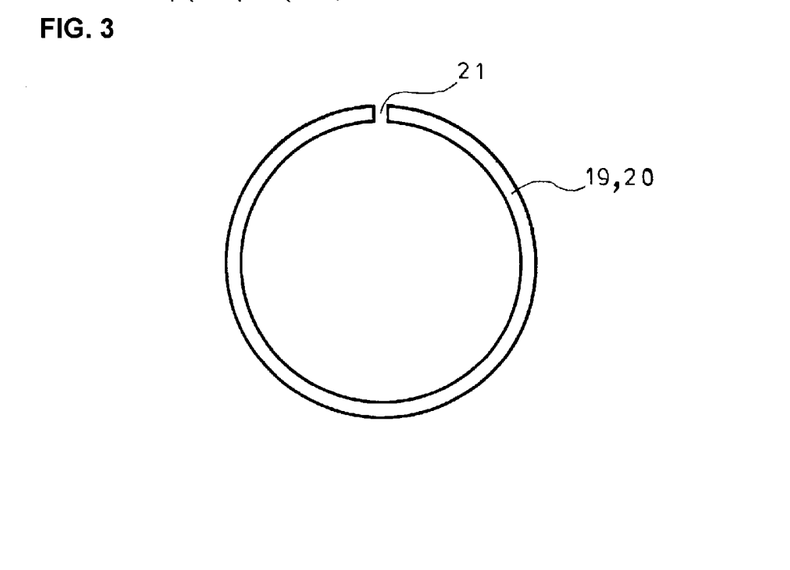
FIG. 3 is a plain view of a conventional sealing piston ring.

However, even if the sealing piston rings 19 and 20 are disposed in the gap 15' for prevention of the gas leakage as described above, the prevention of the gas leakage is limited. Specifically, each of the sealing piston rings 19 and 20 must have a closed gap 21 as shown in FIG. 3 and cannot be formed as continuous ring and, therefore, even if the positions of the closed gaps 21 in the two rings 19 and 20 are shifted from each other, the gas is allowed to leak through the closed gaps 21.

Moreover, even if the inner periphery of the shoulder 16 of the nozzle facing portion 14 is machined with higher circularity, any slight deviation in circularity of the sealing piston rings 19 and 20 makes the rings 19 and 20 unable to closely contact the inner periphery of the nozzle facing portion 14 with uniform pressure, leading to leakage of the gas through the outer peripheries of the rings 19 and 20.

The invention was conceived in view of the above and has its object to provide a sealing device for a turbocharger capable of reliably closing a gap between a turbine housing and an exhaust nozzle with a simple structure to improve sealability.

Means for Solving the Problems

The invention provides a sealing device for a turbocharger having a gap between a turbine housing with a scroll passage and a turbine-housing-side exhaust introducing wall of an exhaust nozzle, comprising:

a seal body annularly formed to have a fitted/fixed portion airtightly fitted and fixed to a shoulder in the turbine housing formed facing the scroll passage and have a clearance facing portion facing an outer periphery of said turbine-housing-side exhaust introducing wall with a clearance, said clearance facing portion being caused to be pressed against the turbine-housing-side exhaust introducing wall due to a difference in fluid pressure between the clearance and the scroll passage, and slipout preventive means formed on at least either of the shoulder and the fitted/fixed portion of the seal body for preventing the fitted/fixed portion from slipping out of the shoulder.

According to the above means, the following operation can be acquired.

On the one hand, the fitted/fixed portion of the seal body airtightly fitted and fixed to the shoulder formed facing the scroll passage of the turbine housing ensures the sealing in this area, and the slipout preventive means formed at least either of the shoulder and the fitted/fixed portion of the seal body can prevent the fitted/fixed portion from slipping out of the shoulder. On the other hand, with the clearance facing portion on the outer-peripheral-end side facing an outer periphery of the turbine-housing-side exhaust introducing wall with a clearance, when the turbocharger is operated, a difference in fluid pressure between the clearance and the scroll passage deforms the seal body to cause the clearance facing portion to be pressed against the outer periphery of the turbine-housing-side exhaust introducing wall, thereby closing the clearance S. Thus, the automatic sealing by the clearance facing portion is achieved to effectively seal the gap.

In said sealing device for the turbocharger, said shoulder may comprise an annular wall orthogonal to an axis of a turbine impeller and a cylindrical wall orthogonal to said annular wall and about the axis of said turbine impeller, said fitted/fixed portion comprising an inner annular portion extending along the annular wall of said shoulder and an inner cylindrical portion extending from an inner peripheral end of said inner annular portion along the cylindrical wall of said shoulder toward the turbine-housing-side exhaust introducing wall, said slipout preventive means being provided by tapering the inner cylindrical portion of said fitted/fixed portion into a shape with an open end reduced in diameter.

In said sealing device for the turbocharger, said shoulder may comprise an annular wall orthogonal to an axis of a turbine impeller and a cylindrical wall orthogonal to said annular wall and about the axis of said turbine impeller, said fitted/fixed portion comprising an inner annular portion extending along the annular wall of said shoulder and an inner cylindrical portion extended from an inner peripheral end of said inner annular portion along the cylindrical wall of said shoulder toward the turbine-housing-side exhaust introducing wall, said slipout preventive means being provided by forming a protrusion on an outer periphery of the cylindrical wall of said shoulder adjacent to an open end thereof which engages with an open end of the inner cylindrical portion of said fitted/fixed portion.

In said sealing device for the turbocharger, said shoulder may comprise an annular wall orthogonal to an axis of a turbine impeller and a cylindrical wall orthogonal to said annular wall and about the axis of said turbine impeller, said fitted/fixed portion comprising an inner annular portion extending along the annular wall of said shoulder, said slipout preventive means being provided by forming a groove on an outer periphery of the cylindrical wall of said shoulder adjacent to the annular wall thereof into which an open end of the inner annular portion of said fitted/fixed portion is fitted.

Advantageous Effect of Invention

A sealing device for a turbocharger of the invention can achieve an excellent effect that the gap between the turbine housing and the exhaust nozzle can be reliably closed with a simple structure to improve the sealability.

DESCRIPTION OF EMBODIMENTS

Embodiments of the invention will be described with reference to the accompanying drawings.

Figure 4:
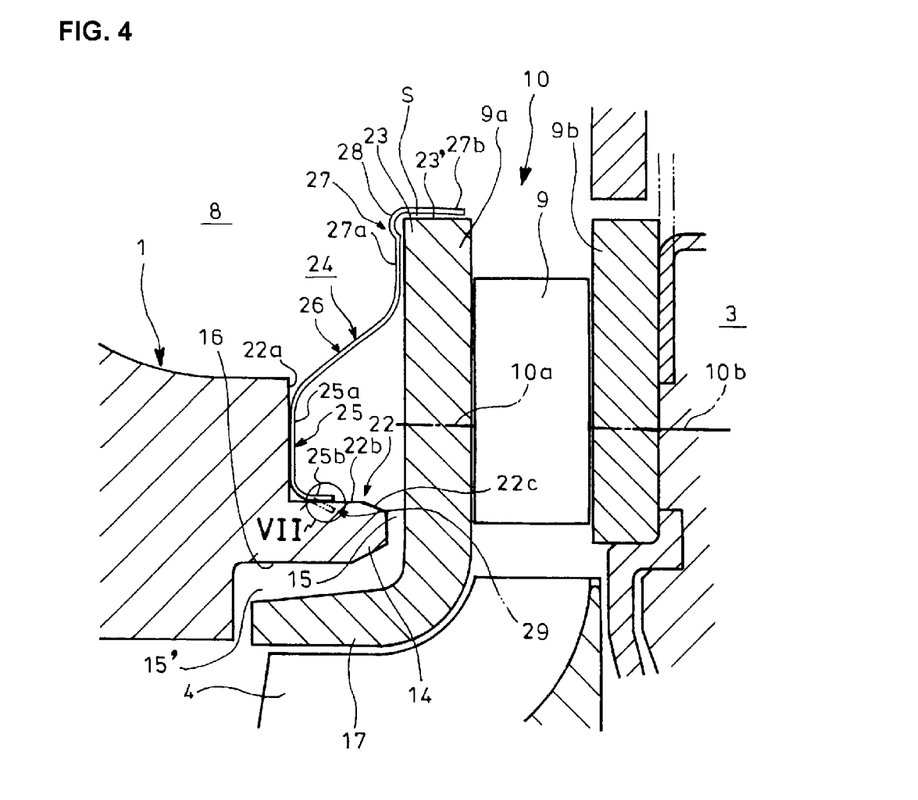
FIG. 4 is an enlarged sectional side elevation of a relevant portion showing a first embodiment of a sealing device for a turbocharger of the invention.
Figure 5:
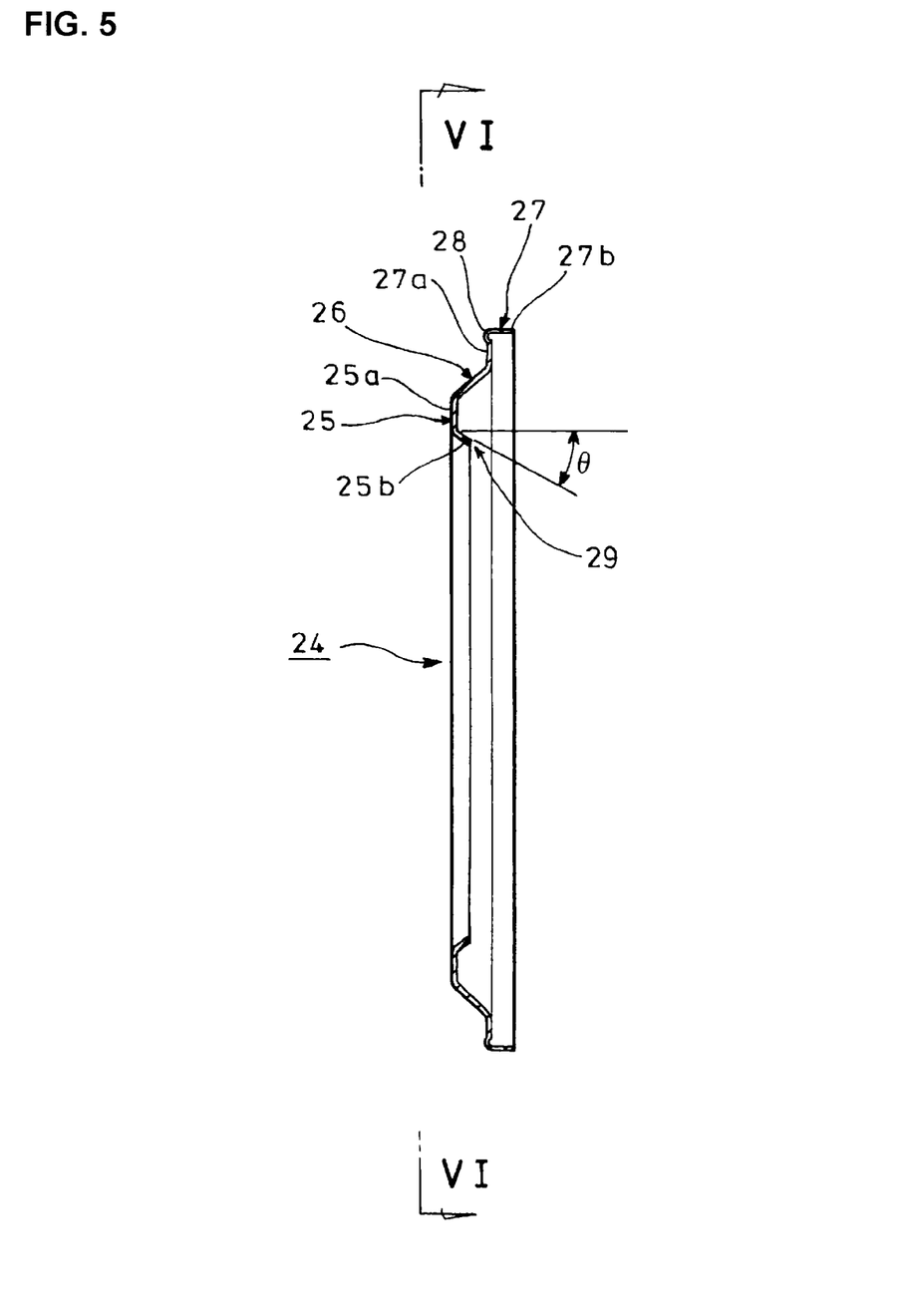
FIG. 5 is an overall sectional view of a seal body in FIG. 4.
Figure 6:
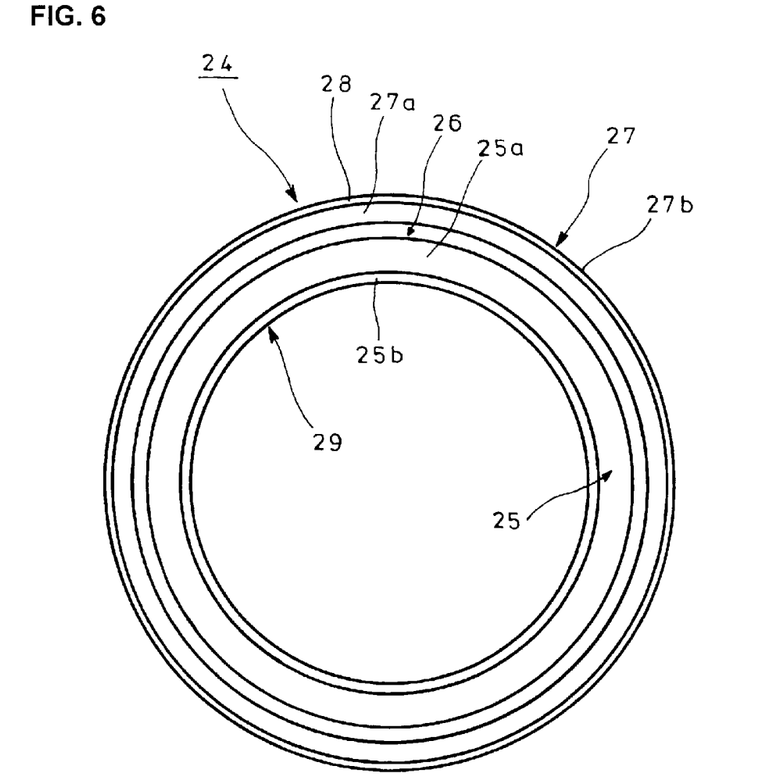
FIG. 6 is an overall plain view of the seal body in FIG. 4, corresponding to an arrow view taken along VI-VI in FIG. 5.

FIGS. 4 to 7 show a first embodiment of a sealing device for a turbocharger of the invention in which parts similar to those in FIGS. 1 and 2 are represented by the same reference numerals. The sealing device comprises a seal body 24 formed annularly as shown in FIGS. 5 and 6 to have an fitted/fixed portion 25 airtightly fitted and fixed to a shoulder 22 in a turbine housing 1 formed facing a scroll passage 8 and have a clearance facing portion 27 facing an outer periphery of a turbine-housing-side exhaust introducing wall 9a of an exhaust nozzle 10 with a clearance S, the clearance facing portion 27 being caused to be pressed against the exhaust introducing wall 9a due to a difference in fluid pressure between the clearance S and the scroll passage 8. The fitted/fixed portion 25 of the seal body 24 is formed with slipout preventive means 29 for prevention of the fitted/fixed portion 25 from slipping out of the shoulder 22.

In the first embodiment, the shoulder 22 comprises, as shown in FIG. 4, an annular wall 22a orthogonal to an axis of a turbine impeller 4 and a cylindrical wall 22b orthogonal to the annular wall 22a and about the axis of the turbine impeller 4. The fitted/fixed portion 25 of the seal body 24 comprises an inner annular portion 25a extending along the annular wall 22a of the shoulder 22 and an inner cylindrical portion 25b extending from an inner peripheral end of the inner annular portion 25a along the cylindrical wall 22b of the shoulder 22 toward the turbine-housing-side exhaust introducing wall 9a. The slipout preventive means 29 is provided by tapering the inner cylindrical portion 25b of the fitted/fixed portion 25 into a shape with an open end reduced in diameter as indicated by an imaginary line in FIG. 4 and shown in FIG. 5.

The inner annular portion 25a of the seal body 24 has an outer peripheral end formed with a frustoconical portion 26 extending outward, away from the annular wall 22a and toward the exhaust introducing wall 9a. The clearance facing portion 27 comprises an outer annular portion 27a extending outward from an outer peripheral end of the frustoconical portion 26 along the exhaust introducing wall 9a and an outer cylindrical portion 27b extending from an outer circumferential end of the outer annular portion 27a along an outer peripheral end surface 23' of the exhaust introducing wall 9a. In the first embodiment, the clearance S is disposed between the clearance facing portion 27 and the exhaust introducing wall 9a; otherwise, with no clearance S disposed for the portion 27, a fluid pressure of the scroll passage 8 applied on the portions 26 and 27 would directly act via the seal body 24 on the exhaust introducing wall 9a of the exhaust nozzle 10 due to lack of a deformation margin of the seal body 24, whereby the exhaust nozzle 10 may be deformed. In order to prevent such deformation, the seal body 24 is formed with the clearance facing portion 27 facing the outer periphery of the turbine-housing-side exhaust introducing wall 9a of the exhaust nozzle 10 with the clearance S.

The inner cylindrical portion 25b of the fitted/fixed portion 25 is preliminarily formed with a base end away from an open end thereof and having a bore diameter airtightly fittable with the cylindrical wall 22b of the shoulder 22; the seal body 24 is airtightly fitted and fixed by press fitting the fitted/fixed portion 25 to the shoulder 22. An inclination angle θ formed by the tapered inner cylindrical portion 25b may be less than 30 degrees in consideration of the airtight fitting thereof into the cylindrical wall 22b of the shoulder 22; preferably, the inclination angle θ is effective to an angle of the order of 10 degrees.

In FIG. 4, reference numeral 28 denotes a convex between the portions 27a and 27b so as to avoid a corner of the outer peripheral end surface 23' of the exhaust introducing wall 9a.

The cylindrical wall 22b of the shoulder 22 has an open end with a convergent tapered surface 22c for smooth fitting of the seal body 24 to the shoulder 22.

An operation of the first embodiment will be described.

The fitted/fixed portion 25 of the seal body 24 is preliminarily airtightly fitted and fixed by press fitting the same to the shoulder 22 in the turbine housing 1 formed facing the scroll passage 8. The inner cylindrical portion 25b of the seal body 24, which is preliminarily formed to have the base end away from the open end of the seal body and having a bore diameter airtightly fittable to the cylindrical wall 22b of the shoulder 22, is airtightly fixed to the cylindrical wall 22b.

Figure 7:
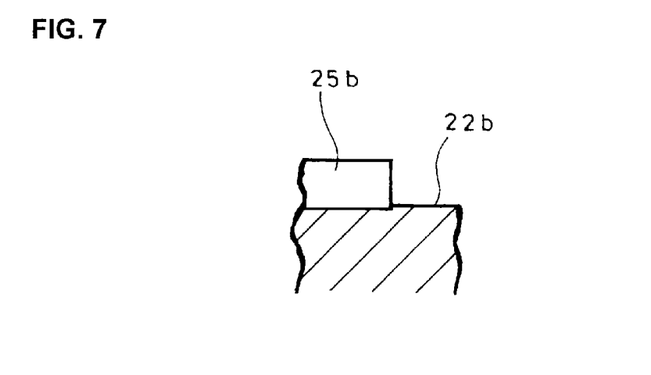
FIG. 7 is an enlarged view of a portion VII in FIG. 4.

Moreover, the inner cylindrical portion 25b of the fitted/fixed portion 25 has the open end formed as slipout preventive means 29 into the tapered shape with the reduced diameter as indicated by the imaginary line in FIG. 4 and shown in FIG. 5, so that a corner of the open end of the inner cylindrical portion 25b bites into the cylindrical wall 22b as a result of a wedge effect as shown in FIG. 7 and the fitting state after press-fitting becomes stronger, thereby reliably preventing the fitted/fixed portion 25 from slipping out of or being displaced on the shoulder 22.

With the seal body 24 being fixed to the shoulder 22 of the turbine housing 1, when the turbine and bearing housings 1 and 3 are assembled and fixed to sandwich the exhaust nozzle 10 as shown in FIG. 1, the turbine-housing-side exhaust introducing wall 9a of the exhaust nozzle 10 faces the clearance facing portion 27 of the seal body 24 with the clearance S.

The fitted/fixed portion 25 on the inner peripheral end side of the seal body 24, which is airtightly fitted to the shoulder 22, ensures the seal in this area.

On the other hand, the clearance facing portion 27 on the outer peripheral end side faces the outer periphery 23 of the exhaust introducing wall 9a with the clearance S. However, when the turbocharger is operated, a fluid pressure acts on the seal body 24 due to the fluid in the scroll passage 8 and a greater fluid passing resistance in the clearance S makes difficult the passing of fluid in the clearance S to lower a pressure in this portion than the pressure in the scroll passage 8, so that the seal body 24 is deformed to cause the clearance facing portion 27 to be pressed against the outer periphery 23 of the exhaust introducing wall 9a, thereby closing the clearance S. Thus, automatic sealing by the clearance facing portion 27 is achieved to effectively seal the gap 15. Moreover, the formation of the clearance facing portion 27 on the seal body 24 facing the outer periphery of the exhaust introducing wall 9a of the exhaust nozzle 10 with the clearance S ensures a deflection margin of the seal body 24 when the fluid pressure of the scroll passage 8 acts on the frustoconical portion 26 and the clearance facing portion 27 to thereby reduce a force directly acting via the seal body 24 on and trying to deform the exhaust introducing wall 9a of the exhaust nozzle 10, which is much effective for prevention of the deformation of the exhaust nozzle 10.

Thus, the gap 15 between the turbine housing and the exhaust nozzle 10 can be reliably closed with the simple structure to improve the sealability.

Figure 8:
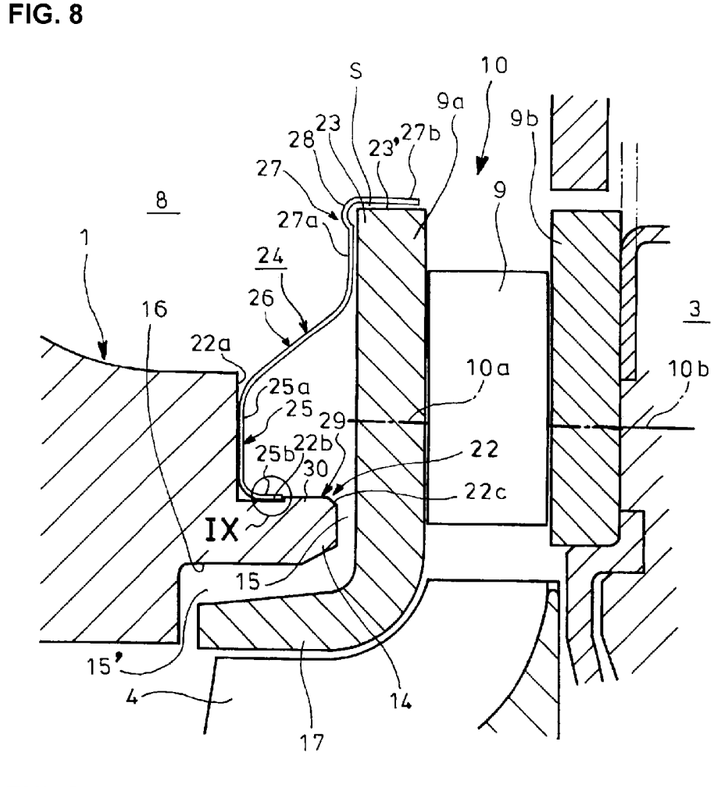
FIG. 8 is an enlarged sectional side elevation of a relevant portion showing a second embodiment of a sealing device for a turbocharger of the invention.
Figure 9:
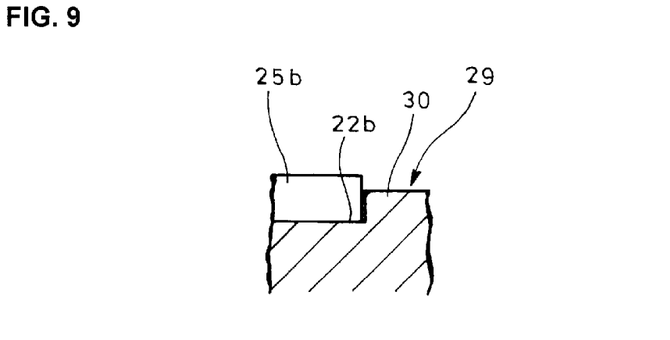
FIG. 9 is an enlarged view of a portion IX in FIG. 8.

FIGS. 8 and 9 show a second embodiment of the sealing device for the turbocharger according to the invention in which parts similar to those in FIGS. 4-7 are represented by the same reference numerals. The second embodiment, which has a basic configuration similar to that in the first embodiment shown in FIGS. 4-7, is characteristic in that, as shown in FIGS. 8 and 9, a protrusion 30 is formed on an outer periphery of the cylindrical wall 22b adjacent to an open end of the cylindrical wall 22b of the shoulder 22 to engage with an open end of the inner cylindrical portion 25b of the fitted/fixed portion 25, thereby providing the slipout preventive means 29 which prevents the fitted/fixed portion 25 from slipping out of the shoulder 22.

The inner cylindrical portion 25b of the seal body 24 is preliminarily formed to have a bore diameter airtightly fittable to the cylindrical wall 22b of the shoulder 22.

The open end of the cylindrical wall 22b of the shoulder 22 with the protrusion 30 as the slipout preventive means 29 is formed with a convergent tapered surface 22c as is the case with the first embodiment shown in FIG. 4 for smooth fitting of the seal body 24 to the shoulder 22.

An operation of the second embodiment will be described.

The fitted/fixed portion 25 of the seal body 24 is preliminarily fitted and fixed by press fitting the same to the shoulder 22 in the turbine housing 1 formed facing the scroll passage 8 such that the inner cylindrical portion 25b is displaced beyond the protrusion 30 acting as the slipout preventive means 29. Since the inner cylindrical portion 25b of the seal body 24 is preliminarily formed to have a bore diameter airtightly fittable to the cylindrical wall 22b of the shoulder 22, the inner cylindrical portion 25b is airtightly fitted and fixed to the cylindrical wall 22b after the inner cylindrical portion 25b is displaced beyond the protrusion 30 acting as the slipout preventive means 29.

Moreover, the open end of the inner cylindrical portion 25b of the fitted/fixed portion 25 is engaged with the protrusion 30 acting as the slipout preventive means 29 as shown in FIGS. 8 and 9, the fitted/fixed portion 25 can be reliably prevented from slipping out of or being displaced in the shoulder 22 after press-fitting.

With the seal body 24 being fixed to the shoulder 22 of the turbine housing 1, when the turbine and bearing housings 1 and 3 are assembled and fixed to sandwich the exhaust nozzle 10 as shown in FIG. 1, the turbine-housing-side exhaust introducing wall 9a of the exhaust nozzle 10 faces the clearance facing portion 27 of the seal body 24 with the clearance S as is the case with the first embodiment shown in FIG. 4. The fitted/fixed portion 25 on the inner peripheral end side of the seal body 24, which is airtightly fitted to the shoulder 22, ensures the sealing in this area. on the other hand, the clearance facing portion 27 on the outer peripheral end side faces the outer periphery 23 of the exhaust introducing wall 9a with the clearance S. When the turbocharger is operated, a pressure due to the fluid in the scroll passage 8 acts on the seal body 24 and the greater fluid passing resistance in the clearance S makes difficult passing of fluid in the clearance S to lower a pressure in this portion than the pressure in the scroll passage 8, so that the seal body 24 is deformed to cause the clearance facing portion 27 to be pressed against the outer periphery 23 of the exhaust introducing wall 9a, thereby closing the clearance S. Thus, automatic sealing by the clearance facing portion 27 is achieved to effectively seal the gap 15.

In the second embodiment shown in FIGS. 8 and 9, as is the case with the first embodiment shown in FIGS. 4 to 7, the gap 15 between the turbine housing and the exhaust nozzle 10 can be reliably closed with the simple structure to improve the sealability.

In the second embodiment shown in FIGS. 8 and 9, in addition to forming the protrusion 30 engaging with the open end of the inner cylindrical portion 25b of the fitted/fixed portion 25 as the slipout preventive means 29 on the outer peripheral surface of the cylindrical wall 22b of the shoulder 22 adjacent to the open end thereof, it is needless to say that the open end of the inner cylindrical portion 25b of the fitted/fixed portion 25 may be formed into a tapered shape with a reduced diameter as indicated by the imaginary line in FIG. 4 and shown in FIG. 5 as is the case with the first embodiment.

Figure 10:
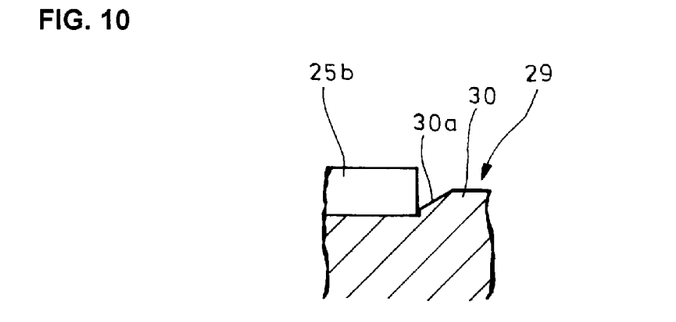
FIG. 10 is a sectional side elevation showing a modification of the second embodiment of the sealing device for a turbocharger of the invention, corresponding to a portion IX in FIG. 8.

In the second embodiment shown in FIGS. 8 and 9, the protrusion 30 acting as the slipout preventive means 29 may have an edge adjacent to the inner cylindrical portion 25b in the form of a tapered surface 30a with a gradually reduced outer diameter as shown in FIG. 10, which enables the tapered surface 30a to allow more or less displacement in position of the open end of the inner cylindrical portion 25b axially of the turbine impeller 4 due to any deviation in dimension accuracy of the seal body 24. In this case, a corner of the open end of the inner cylindrical portion 25b bites into the tapered surface 30a as a result of the wedge effect, so that the effect of slipping-out prevention and the sealability become effective without concern for inhibition.

Figure 11:
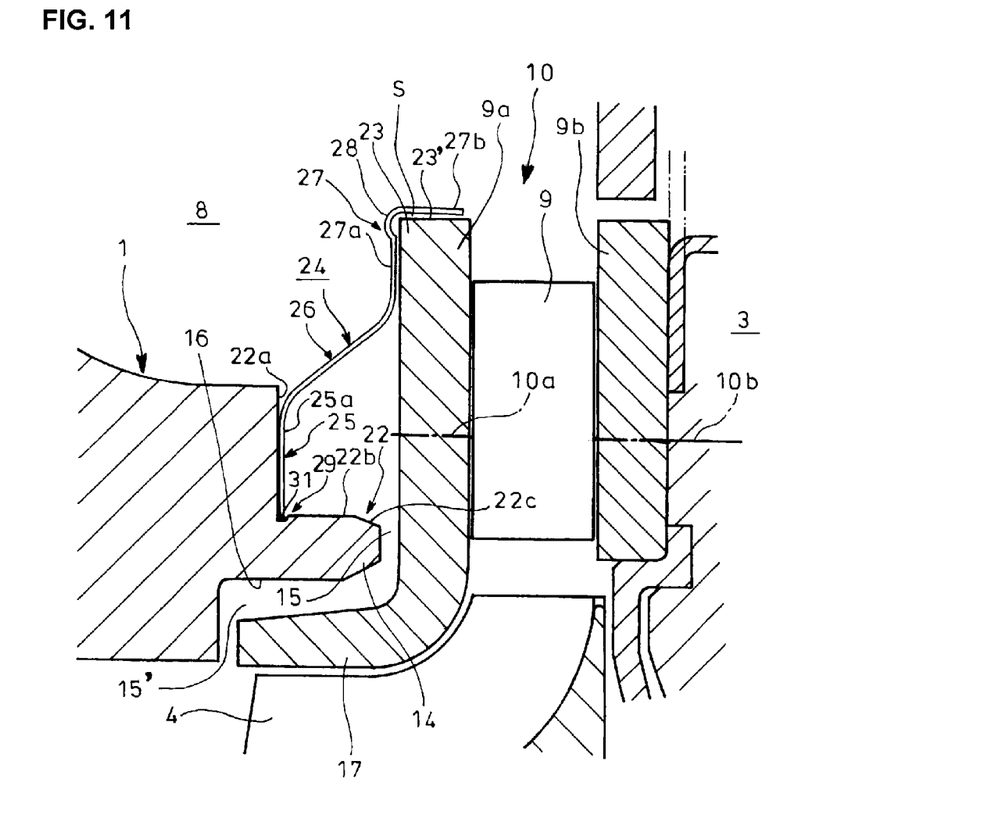
FIG. 11 is an enlarged sectional side elevation of a relevant portion showing a third embodiment of a sealing device for a turbocharger of the invention.

FIG. 11 shows a third embodiment of a sealing device for turbocharger of the invention in which parts similar to those in FIGS. 4 to 7 are represented by the same reference numerals. The third embodiment, which has the basic configuration similar to that in the first embodiments shown in FIGS. 4 to 7, is characteristic in that, as shown in FIG. 11, the fitted/fixed portion 25 comprises the inner annular portion 25a extending along the annular wall 22a of the shoulder 22. The slipout preventive means 29 preventing the fitted/fixed portion 25 from slipping out of the shoulder 22 is provided by a groove 31 formed on the outer periphery of the cylindrical wall 22b of the shoulder 22 adjacent to the annular wall 22a of the shoulder 22, an inner peripheral end of the inner annular portion 25a of the fitted/fixed portion 25 being fitted into the groove 31.

The inner peripheral end of the inner annular portion 25a of the seal body 24 is preliminarily formed to have a bore diameter airtightly fittable into the groove 31 formed as the slipout preventive means 29 on the cylindrical wall 22b of the shoulder 22.

An operation of the third embodiment will be described.

The fitted/fixed portion 25 of the seal body 24 is preliminarily fitted and fixed by press fitting the same into the shoulder 22 in the turbine housing 1 formed facing the scroll passage 8 such that the inner peripheral end of the inner annular portion 25a is fitted into the groove 31 acting as the slipout preventive means 29. Since the inner peripheral end of the inner annular portion 25a of the seal body 24 is preliminarily formed to have the bore diameter airtightly fittable into the recessed groove 31 as the slipout preventive means 29 on the cylindrical wall 22b of the shoulder 22, the inner annular portion 25a is airtightly fixed to the cylindrical wall 22b while closely contacting the annular wall 22a.

Moreover, the inner peripheral end of the inner annular portion 25a of the fitted/fixed portion 25 is fitted into the recessed groove 31 acting as the slipout preventive means 29 as shown in FIG. 11, so that the fitted/fixed portion 25 can be reliably prevented from slipping out of or being displaced in the shoulder 22 after press-fitting.

With the seal body 24 being fixed to the shoulder 22 of the turbine housing 1, when the turbine and bearing housings 1 and 3 are assembled and fixed to sandwich the exhaust nozzle 10 as shown in FIG. 1, the turbine-housing-side exhaust introducing wall 9a of the exhaust nozzle 10 faces the clearance facing portion 27 of the seal body 24 with the clearance S as is the case with the first and second embodiments shown in FIGS. 4 and 8, respectively. The fitted/fixed portion 25 on the inner peripheral end side of the seal body 24, which is airtightly fitted to the shoulder 22, ensures the sealing in this area. On the other hand, the clearance facing portion 27 on the outer peripheral end side faces the outer periphery 23 of the exhaust introducing wall 9a with the clearance S. When the turbocharger is operated, a pressure due to the fluid in the scroll passage 8 acts on the seal body 24 and the greater fluid passing resistance in the clearance S makes difficult passing of fluid in the clearance S to lower a pressure in this portion than the pressure in the scroll passage 8, so that the seal body 24 is deformed to cause the clearance facing portion 27 to be pressed against the outer periphery 23 of the exhaust introducing wall 9a, thereby closing the clearance S. Thus, automatic sealing by the clearance facing portion 27 is achieved to effectively seal the gap 15.

In the third embodiment shown in FIG. 11, as is the case with the first and second embodiments shown in FIGS. 4-7 and 8-9, respectively, the gap 15 between the turbine housing and the exhaust nozzle 10 can be reliably closed with the simple structure to improve the sealability.

It is to be understood that a sealing device for a turbocharger according to the invention is not limited to the above embodiments and that various changes and modifications may be made without departing from the scope of the invention.

REFERENCE SIGNS LIST 1 turbine housing
4 turbine impeller
8 scroll passage
9a turbine-housing-side exhaust introducing wall
10 exhaust nozzle
15 gap
22 shoulder
22a annular wall
22b cylindrical wall
23 outer periphery
24 seal body
25 fitted/fixed portion
25a inner annular portion
25b inner cylindrical portion
26 frustoconical portion
27 clearance facing portion
29 slipout preventive means
30 protrusion
30a tapered surface
31 groove
S clearance
θ inclination angle

The invention claimed is:

1. A sealing device for a turbocharger having a gap between a turbine housing with a scroll passage and a turbine-housing-side exhaust introducing wall of an exhaust nozzle, comprising:
- a seal body annularly formed to have a fitted/fixed portion airtightly fitted and fixed to a shoulder in the turbine housing formed facing the scroll passage and have a clearance facing portion facing an outer periphery of said turbine-housing-side exhaust introducing wall with a clearance, said clearance facing portion being caused to be pressed against the turbine-housing-side exhaust introducing wall due to a difference in fluid pressure between the clearance and the scroll passage, and
- slipout preventive means formed on at least either of the shoulder and the fitted/fixed portion of the seal body for preventing the fitted/fixed portion from slipping out of the shoulder.

2. The sealing device for the turbocharger as claimed in claim 1 wherein said shoulder comprises an annular wall orthogonal to an axis of a turbine impeller and a cylindrical wall orthogonal to said annular wall and about the axis of said turbine impeller,
- said fitted/fixed portion comprising an inner annular portion extending along the annular wall of said shoulder and an inner cylindrical portion extending from an inner peripheral end of said inner annular portion along the cylindrical wall of said shoulder toward the turbine-housing-side exhaust introducing wall,
- said slipout preventive means being provided by tapering the inner cylindrical portion of said fitted/fixed portion into a shape with an open end reduced in diameter.

3. The sealing device for the turbocharger as claimed in claim 1 wherein said shoulder comprises an annular wall orthogonal to an axis of a turbine impeller and a cylindrical wall orthogonal to said annular wall and about the axis of said turbine impeller,
- said fitted/fixed portion comprising an inner annular portion extending along the annular wall of said shoulder and an inner cylindrical portion extended from an inner peripheral end of said inner annular portion along the cylindrical wall of said shoulder toward the turbine-housing-side exhaust introducing wall,
- said slipout preventive means being provided by forming a protrusion on an outer periphery of the cylindrical wall of said shoulder adjacent to an open end thereof which engages with an open end of the inner cylindrical portion of said fitted/fixed portion.

4. The sealing device for the turbocharger as claimed in claim 1 wherein said shoulder comprises an annular wall orthogonal to an axis of a turbine impeller and a cylindrical wall orthogonal to said annular wall and about the axis of said turbine impeller,
- said fitted/fixed portion comprising an inner annular portion extending along the annular wall of said shoulder,
- said slipout preventive means being provided by forming a groove on an outer periphery of the cylindrical wall of said shoulder adjacent to the annular wall thereof into which an open end of the inner annular portion of said fitted/fixed portion is fitted.

* * * * *